Patented July 19, 1932

1,867,755

UNITED STATES PATENT OFFICE

JOSEPH J. PELC, OF CHICAGO, ILLINOIS

PRODUCTION OF BERYLLIUM AND BERYLLIUM COMPOUNDS AND ISOLATION OF BERYLLIUM SALTS

No Drawing. Application filed February 9, 1931, Serial No. 514,691. Renewed March 3, 1932.

This invention relates particularly to the production of metallic beryllium. It also relates to the production of certain new beryllium compounds, which I have termed "organo-metallic beryllium compounds", from which metallic beryllium may be readily obtained. The invention further relates to the isolation of beryllium salts from mixtures of beryllium compounds and compounds of other metals as, for example, the isolation of beryllium salts from native beryllium-bearing ores.

The principal object of this invention is to provide an economical process of producing metallic beryllium.

An important object of the invention is to provide a relatively simple and commercially economical process of isolating beryllium salts from beryllium-bearing ores.

A further object of the invention is to provide certain new beryllium compounds of the type hereinafter described, from which metallic beryllium may be readily produced.

Other objects and advantages of the invention will become apparent during the course of the following description.

As is well known, the metal beryllium has many markedly advantageous properties which would cause this metal to be put to many commercial uses if the metal were available at a reasonable price. However, the processes of recovering beryllium from its ores which have heretofore been proposed and used have not been capable of producing metallic beryllium at a sufficiently low price to make wide commercial use of the metal possible. As a result of extended research conducted in an effort to produce beryllium at materially reduced cost, I have discovered a relatively simple and commercially practical process whereby metallic beryllium can be produced from its salts or its ores and made available for commercial use at a price many times lower than its present price.

My process is based on my discovery that by reacting beryllium salts with organic carbon compounds not containing oxygen, or derivatives of such compounds, a new type of compound is produced from which pure metallic beryllium can be readily recovered in substantially quantitative yields. The new compounds produced may be considered as intermediate compounds between the beryllium salts treated and the respective organic carbon compounds employed. Since, in these compounds, beryllium is combined with an organic carbon compound, I have termed them "organo-metallic beryllium compounds" for the sake of convenience of expression.

In preparting the organo-metallic beryllum compounds, a beryllium salt, preferably beryllium oxide, is treated with an organic carbon compound not containing oxygen, or a derivative thereof, at an elevated temperature with or without a catalyst. Among the organic carbon compounds not containing oxygen which I have found to be suitable for use in forming the organo-metallic beryllium compounds are (a) hydrocarbons, both saturated and unsaturated, such as aliphatic hydrocarbons, notably kerosene; cyclic hydrocarbons, preferably benzene; and alicyclic hydrocarbons, particularly naphthalene; and (b) organic nitrogen derivatives such as primary and secondary amines and imines, notably aniline, hydrazines, azo-, diazo-, and hydrazo- compounds, such as hydrazobenzene, and nitriles and isonitriles. It is to be understood that such organic carbon compounds and their derivatives are to be included in the term "organic carbon compounds not containing oxygen".

As stated above, the new beryllium compounds are produced by heating a beryllium salt with an organic carbon compound of the character described. In the case of solid organic carbon compounds the reaction is preferably effected by fusing the beryllium salt with the organic compound. Another method is by boiling the beryllium salt in a solution of the solid organic compound in an inert solvent. In the case of organic carbon compounds which are gaseous or readily converted into gaseous form, the reaction may advantageously be effected by passing the organic compound in gaseous phase over a heated beryllium salt. In the case of liquid organic carbon compounds, it is preferable to boil such a compound with a beryllium salt under pressure or simply under reflux to produce the organo-metallic compound.

Although beryllium salts other than beryllium oxide may be satisfactorily converted into organo-metallic beryllium compounds in accordance with this invention, as indicated in detail below, I prefer to treat beryllium oxide. When this compound is heated at a suitable elevated temperature with an organic carbon compound of the character referred to, the oxygen of the beryllium oxide combines with hydrogen of the organic compound to form water and the beryllium combines with the organic radicle present. In the case of the reaction between beryllium oxide and aniline at approximately the boiling point of the latter the reaction proceeds in accordance with the following equation:

$$2C_6H_5NH_2 + BeO \rightarrow Be(C_6H_5NH)_2 + H_2O$$

The following equation represents a similar reaction between beryllium oxide and benzene $$2C_6H_6 + BeO \rightarrow Be(C_6H_5)_2 + H_2O$$

In the event that a salt of beryllium other than beryllium oxide is to be treated in the absence of a catalyst with an organic carbon compound of the character referred to the reaction is conducted under pressure at a temperature above the decomposition point of the beryllium salt into beryllium oxide in order to for the organo-metallic beryllium compound. For example, in the case of beryllium sulfate or carbonate the salt and the organic compound are heated under pressure at a temperature sufficiently high to decompose the salt with the formation of beryllium oxide whereupon the latter reacts with the organic compound in the manner described above.

Although I have found that the treatment of a beryllium salt with an organic carbon compound of the character referred to produces definite amounts of an organic-metallic beryllium compound, in most instances the reactions proceed slowly and the yield of the desired compound is too low for best commercial practice. For this reason, I prefer to employ a catalyst to accelerate the reaction and to increase the yield of the organo-metallic beryllium compound. As a result of extended research, I have found that numerous materials will serve satisfactorily as catalysts in promoting the reaction. For example, practically any dry salt which can be dried without decomposition is suitable for use and I have employed with marked success the salts of carbonic, hydrochloric, sulfuric, phosphoric, silicic, hydrofluoric and even nitric, acetic and tartaric acids. Moreover, alkali hydroxides, which have been dried and preferably fused, can advantageously be used as catalysts. In addition, oxides of iron, aluminium, manganese, nickel, chromium and the like, may be used as catalysts with complete success. Dry gaseous ammonia will also serve satisfactorily as a catalyst. Cyanides and aniline salts may also be used successfully. In fact, it appears that any compound which will promote the combination between the oxygen of beryllium oxide and the hydrogen of the organic carbon compound employed, i. e. will act as a condensing agent, may satisfactorly be used as a catalyst. For this reason I have termed the materials "catalytic condensing agents."

The manner in which the catalytic condensing agent functions in connection with the reaction is indicated by the following equation representing the reaction between aniline and beryllium oxide in the presence of aluminum oxide:

$$6C_6H_5NH_2 + 3BeO + Al_2O_3 \rightarrow 3Be(C_6H_5NH)_2 + 2Al(OH)_3$$

When a salt other than beryllium oxide is treated with an organic carbon compound in the presence of a catalyst the reaction is conducted preferably under pressure at a temperature above the decomposition point of the beryllium salt into beryllium oxide. The acidic ion produced by the decomposition combines with the catalytic condensing agent and the reaction proceeds as described above with the formation of an organo-metallic compound. For example, when beryllium sulfate is treated with an organic carbon compound in the presence of aluminum oxide the reaction is conducted under pressure at a temperature sufficiently high to decompose the beryllium sulfate with the formation of beryllium oxide. The result is similar when other beryllium salts are employed.

The following examples are illustrative of the invention:

Finely divided beryllium oxide is mixed with an excess of kerosene and heated under pressure or under reflux at the boiling point of the mixture, i. e. about 300° C. By continuing the treatment for from eight to twenty-four hours small amounts of organo-metallic beryllium compounds are formed and from these compounds metallic beryllium can be obtained by reduction, heat treatment, electrolysis or other conventional methods.

When gaseous hydrocarbons are passed over beryllium salts similar results are obtained. When benzene is employed in place of kerosene in the example described above, a small amount of beryllium diphenyl is formed. Upon heating this compound to about 300° C. metallic beryllium can be obtained. When napthalene is fused with beryllium oxide and heated for several hours, for example, a certain amount of beryllium dinaphthyl is formed from which metallic beryllium in small quantity is readily obtainable. When pure dry beryllium oxide is mixed with pure, dry, redistilled aniline and the mixture digested for about ten hours under pressure or under reflux at the boiling point of aniline a small amount of organo-metallic beryllium compound is obtained.

When beryllium salts other than beryllium oxide are treated in the manner indicated, the results are somewhat different due, it appears, to the fact that in many cases the salts can act to a certain extent as their own catlyzers, i. e. as autocatalyzers. This is not true of calcined beryllium oxide since this material is extremely resistant.

While, as indicated above, numerous organic carbon compounds can be used in the practice of the process, I have found that the use of aniline with a catalytic condensing agent results in best commercial practice for the reduction of beryllium salts and their extraction from native ores. This is due to the easy formation of hydrazobenzene, the combination of it with beryllium salts, and the highly reducing properties of hydrazobenzene. The use of aniline is also commercially advantageous in that very valuable by-products can be isolated or these can easily be changed back to aniline which can be used again in the practice of the process. However, the particular advantage of using aniline is that by its use an organo-metallic beryllium compound is very easily formed, from which pure metallic beryllium is readily obtained. This organo-metallic beryllium compound may be considered to be beryllium hydrazobenzide. The formation of this salt is not only important in the production of metallic beryllium but it is also important in the isolation of beryllium salts from other salts since no other metal or its salts can form this compound under given conditions. Particularly, the salt cannot be formed from the metals or their salts which are ordinarily found mixed or combined with beryllium salts in native ores.

Beryllium hydrazobenzide, which might also be considered as beryllium anilide, in dry state, is a grayish white powder of strongly metallic taste; in solutions it has a yellowish color. The salt in dry state is quite stable, but when heated at about 200-250° C. is decomposed into azobenzene and aniline; when heated to over 300° C. it is decomposed into azoxybenzene and aniline. It is decomposed by water to the stable form of hydroxide, and by acids to give pure beryllium salts. With alcohols it forms beryllium alcoholates and aniline or hydrazobenzene, depending upon the degree of decomposition.

The most important property of this salt, as I have discovered by my research, is its solubility in an excess of aniline or other inert organic solvents such, for example, as benzene, ether, carbon tetrachloride and the like. This property is of particular commercial importance in obtaining pure beryllium salts directly from the ores, or the organo-metallic beryllium compounds may, if desired, be readily reduced to produce pure metallic beryllium.

The following example illustrates the use of mechanical catalyzers in the practice of the process. If an excess of benzene or kerosene is boiled under reflux with a beryllium salt and about an equal part of dry potassium carbonate, the water which is formed being first distilled off, the reaction takes place in about two to three hours and organo-metallic beryllium compounds are formed which on further heating at about 350° C. yield metallic beryllium more or less mixed with carbon. The same result is obtained when the process is modified and organic carbon compounds in gaseous or solid form are used.

The use of catalyzers in conjunction with aniline is of considerable scientific interest, as is indicated by the following example:

Ten or more parts of dry, white, redistilled aniline, one part by weight of dry, calcined beryllium oxide, and about two parts of dry potassium carbonate are mixed together and this mixture is distilled quickly until clear aniline comes over. Thereupon, the mass is digested under reflux for about two hours at the boiling point of aniline. Thereafter, the excess of aniline is distilled off, the mixture is heated above 300° C. or until no azoxybenzene is formed, and the residue is washed with alcohol, dissolved with water, and filtered. Beryllium is obtained in the form of steel gray, crystaline powder or small silvery flakes and hexagons.

The following method is of interest in the explanation and scientific study of the mechanics of this seemingly peculiar reaction, which reaction, however, follows strictly the laws of organic intra- and intermolecular rearrangements.

About twenty parts of aniline, one part of calcined beryllium oxide, and two parts of aluminum oxide are mixed together. To this mixture I prefer to add, although this is not necessary, about one part of fused sodium hydroxide. This mixture is digested under pressure at the boiling point of aniline for about two hours, or until steel blue crystals of beryllium begin to separate. The mass is then cooled and filtered and the residue washed with aniline or other inert solvent. The filtrates are combined and aniline is distilled off. A part of the residue is heated at about 200° C. for approximately fifteen minutes. When this part is dissolved in alcohol, beryllium separates and azobenzene can be isolated; in some instances the azobenzene is mixed with undecomposed hydrazobenzene. The other part of the residue is heated above 300° C., whereupon yellowish needles of azoxybenzene separate and beryllium remains in the receiver. In this case, the beryllium is obtained in a completely quantitative yield in the form of steel blue crystals or reguli or silvery, shining hexagons.

The foregoing description has been concerned primarily with the treatment of isolated or pure beryllium salts. However, the process is particularly advantageous for treating beryllium-bearing ores. In treating ores, the ore is powdered very finely and fused with about equal parts of an alkali hydroxide, carbonate, sulfate, fluoride, or other decomposing agent, or a mixture of them. The whole mixture is then calcined at about 600° C. This pretreatment, which results in converting the beryllium content of the ore into a simple salt, is conventional in prior processes. In the present process the calcined mass is preferably powdered again and is treated with an organic carbon compound of the character referred to. While any of the organic carbon compounds mentioned may be employed, I prefer to employ aniline, since with aniline best commercial practice is possible. The aniline is employed in excess, the exact amount being governed by the percentage of beryllium in the ore. For ordinary American beryl about ten times by weight of aniline is more than sufficient.

As a specific illustration of the process, the powdered, calcined mass described above is mixed with aniline in the proportions of about ten parts of aniline to one part of dry ore. If there are no oxides of iron, aluminum, chromium or the like present, which would serve as catalyzers, about ten per cent. by weight of a catalyst such as aluminum oxide is added and intimately mixed with the mass. The mixture is then digested at or slightly above the boiling point of aniline, say 200° C., under pressure or under reflux for about two hours, or until the mass takes on a dark purple color and little steel blue crystals of beryllium are visible floating on the top of the mass. Thereupon the heating is stopped and the mixture is cooled and filtered. The residue is washed with an inert organic solvent of the character referred to above, preferably aniline. The filtrates are then combined and distilled nearly to dryness. The resulting dry mass is an organo-metallic beryllium compound from which the beryllium is easily obtainable in pure condition. When metallic beryllium is recovered from this compound as by reduction, heat treatment, or electrolysis, the organic part may be recovered as valuable by-products or converted into aniline for further use in the practice of the process.

From the foregoing it will be apparent that I have provided a particularly advantageous process for recovering metallic beryllium; for producing beryllium compounds from which metallic beryllium can be easily obtained; and for isolating beryllium salts from mixtures of beryllium compounds with compounds of other metals. A particularly desirable feature of the process is that, when metallic beryllium is desired, the metal is obtained in substantially quantitative yields and in pure condition. For this reason, the process is commercially economical, and thus overcomes the marked disadvantages of the processes heretofore employed.

While I have described in detail the preferred practice of my process, it is to be understood that the details of procedure and the materials employed may be variously modified without departing from the spirit of the invention or the scope of the subjoined claims.

I claim:

1. The process of producing beryllium from salts containing the same which comprises reacting a beryllium salt with an organic carbon compound not containing oxygen, and treating the resulting organo-metallic beryllium compound to recover metallic beryllium therefrom.

2. The process of producing beryllium from salts containing the same which comprises reacting a beryllium salt with an organic carbon compound not containing oxygen, comprising a hydrocarbon, and treating the resulting organo-metallic beryllium compound to recover metallic beryllium therefrom.

3. The process of producing beryllium from salts containing the same which comprises reacting a beryllium salt with an organic carbon compound not containing oxygen, comprising an organic nitrogen derivative, and treating the resulting organo-metallic beryllium compound to recover metallic beryllium therefrom.

4. The process of producing beryllium from salts containing the same which comprises reacting beryllium oxide with an organic carbon compound not containing oxygen, and treating the resulting organo-metallic beryllium compound to recover metallic beryllium therefrom.

5. The process of producing beryllium from salts containing the same which comprises reacting beryllium oxide with an organic carbon compound not containing oxygen, comprising a hydrocarbon, and treating the resulting organo-metallic beryllium compound to recover metallic beryllium therefrom.

6. The process of producing beryllium from salts containing the same which comprises reacting beryllium oxide with an organic carbon compound not containing oxygen, comprising an organic nitrogen derivative, and treating the resulting organo-metallic beryllium compound to recover metallic beryllium therefrom.

7. The process of producing beryllium from salts containing the same which comprises reacting a beryllium salt with an organic carbon compound not containing oxygen in the presence of a catalytic condensing agent, and treating the resulting organo-metallic beryllium compound to recover metallic beryllium therefrom.

8. The process of producing beryllium from salts containing the same which comprises reacting in the presence of a catalytic condensing agent a beryllium salt with an organic carbon compound not containing oxygen, comprising a hydrocarbon, and treating the resulting organo-metallic beryllium compound to recover metallic beryllium therefrom.

9. The process of producing beryllium from salts containing the same which comprises reacting in the presence of a catalytic condensing agent a beryllium salt with an organic carbon compound not containing oxygen, comprising an organic nitrogen derivative, and treating the resulting organo-metallic beryllium compound to recover metallic beryllium therefrom.

10. The process of producing beryllium from salts containing the same which comprises reacting beryllium oxide with an organic carbon compound not containing oxygen in the presence of a catalytic condensing agent, and treating the resulting organo-metallic beryllium compound to recover metallic beryllium therefrom.

11. The process of producing beryllium from salts containing the same which comprises reacting in the presence of a catalytic condensing agent beryllium oxide with an organic carbon compound not containing oxygen, comprising a hydrocarbon, and treating the resulting organo-metallic beryllium compound to recover metallic beryllium therefrom.

12. The process of producing beryllium from salts containing the same which comprises reacting in the presence of a catalytic condensing agent beryllium oxide with an organic carbon compound not containing oxygen, comprising an organic nitrogen derivative, and treating the resulting organo-metallic beryllium compounds to recover metallic beryllium therefrom.

13. The process of producing organo-metallic beryllium compounds from which metallic beryllium may readily be recovered which comprises heating a beryllium salt in finely divided form with a liquid organic carbon compound not containing oxygen to the boiling point of the organic carbon compound.

14. The process of producing organo-metallic beryllium compounds from which metallic beryllium may readily be recovered which comprises heating a beryllium salt with a solid organic carbon compound not containing oxygen to the fusion point of the organic carbon compound.

15. The process of producing organo-metallic beryllium compounds from which metallic beryllium may readily be recovered which comprises heating a beryllium salt in contact with a gaseous organic carbon compound not containing oxygen at a temperature at least as high as the expulsion point of water and below the decomposition point of the organic carbon compound.

16. The process of producing organo-metallic beryllium compounds from which metallic beryllium may readily be recovered which comprises heating a beryllium salt in finey divided form in the presence of a catalytic condensing agent with a liquid organic carbon compound not containing oxygen to the boiling point of the organic carbon compound.

17. The process of producing organo-metallic beryllium compounds from which metallic beryllium may readily be recovered which comprises heating beryllium oxide in finely divided form with aniline to the boiling point of aniline.

18. The process of producing organo-metallic beryllium compounds from which metallic beryllium may readily be recovered which comprises heating beryllium oxide in finely divided form in the presence of a catalytic condensing agent with aniline to the boiling point of aniline.

19. A new organo-metallic beryllium compound consisting of beryllium combined with the radicle of an organic carbon compound not containing oxygen.

20. As a new beryllium compound, beryllium hydrazobenzide.

21. The process of recovering beryllium from ores containing the same which comprises pretreating the ore to convert the beryllium content into a simple salt, treating the resulting mass in finely divided form with an organic carbon compound not containing oxygen to convert the beryllium salt into an organo-metallic beryllium compound, and recovering the same by solution in an inert solvent thereof.

22. The process of recovering beryllium from ores containing the same which comprises preteating the ore to convert the beryllium content into beryllium oxide, treating the resulting beryllium oxide in finely divided form, a catalytic condensing agent being present, with an organic carbon compound not containing oxygen to convert the beryllium salt into an organo-metallic beryllium compound, and recovering the same by solution in an inert solvent thereof.

23. The process of recovering beryllium from ores containing the same which comprises pretreating the ore to convert the beryllium content into a simple salt, treating the resulting mass in finely divided form with aniline at a temperature at least as high as the boiling point of aniline to convert the beryllium salt into an organo-metallic beryllium compound, and recovering the same by solution in an inert solvent thereof.

24. The process of recovering beryllium from ores containing the same which comprises pretreating the ore to convert the beryllium content into beryllium oxide, treating the resulting mass in finely divided form with an excess of aniline at a temperature at least as high as the boiling point of aniline to convert the beryllium salt into beryllium hydrazobenzide, recovering the beryllium hydrazobenzide in solution in aniline, and distilling such solution substantially to dryness.

In testimony whereof I affix my signature.

JOSEPH J. PELC.